United States Patent
Ozturk et al.

(10) Patent No.: US 7,496,367 B1
(45) Date of Patent: Feb. 24, 2009

(54) METHOD OF MULTI-CARRIER TRAFFIC ALLOCATION FOR WIRELESS COMMUNICATION SYSTEM

(75) Inventors: Ozcan Ozturk, Richardson, TX (US); Ashvin Chheda, Plano, TX (US); Rza Nuriyev, Dallas, TX (US); Alfred Schmidt, Calgary (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 482 days.

(21) Appl. No.: 11/319,314

(22) Filed: Dec. 28, 2005

Related U.S. Application Data

(60) Provisional application No. 60/739,986, filed on Nov. 22, 2005.

(51) Int. Cl.
  *H04Q 7/20* (2006.01)
  *H04B 7/00* (2006.01)
  *H01L 12/28* (2006.01)
  *H01L 12/56* (2006.01)

(52) U.S. Cl. ............... 455/453; 455/464; 455/509; 370/329; 370/395.2

(58) Field of Classification Search ......... 455/450–453, 455/464, 509; 370/329, 395–395.43
See application file for complete search history.

(56) References Cited

U.S. PATENT DOCUMENTS

| | | | | |
|---|---|---|---|---|
| 6,069,871 | A * | 5/2000 | Sharma et al. | 370/209 |
| 6,272,109 | B1 * | 8/2001 | Pei et al. | 370/230 |
| 2004/0125779 | A1 * | 7/2004 | Kelton et al. | 370/338 |

\* cited by examiner

*Primary Examiner*—Alexander Eisen
*Assistant Examiner*—Michael T Thier

(57) ABSTRACT

A dynamic distribution of traffic load across multiple carriers in a wireless communication system. The wireless communication system includes a Base Transmittal Station (BTS) and one or more Access Terminals (ATs). An arriving traffic flow is placed on the carrier pair preferably having the most excess capacity. It is determined whether the new traffic flow is symmetric or asymmetric, and whether it is a best effort (BE) or a delay sensitive (DS) flow type. A procedure is then selected and used to calculate a loading metric for each carrier pair, the new traffic flow being assigned to the carrier pair having the lowest metric.

17 Claims, 2 Drawing Sheets

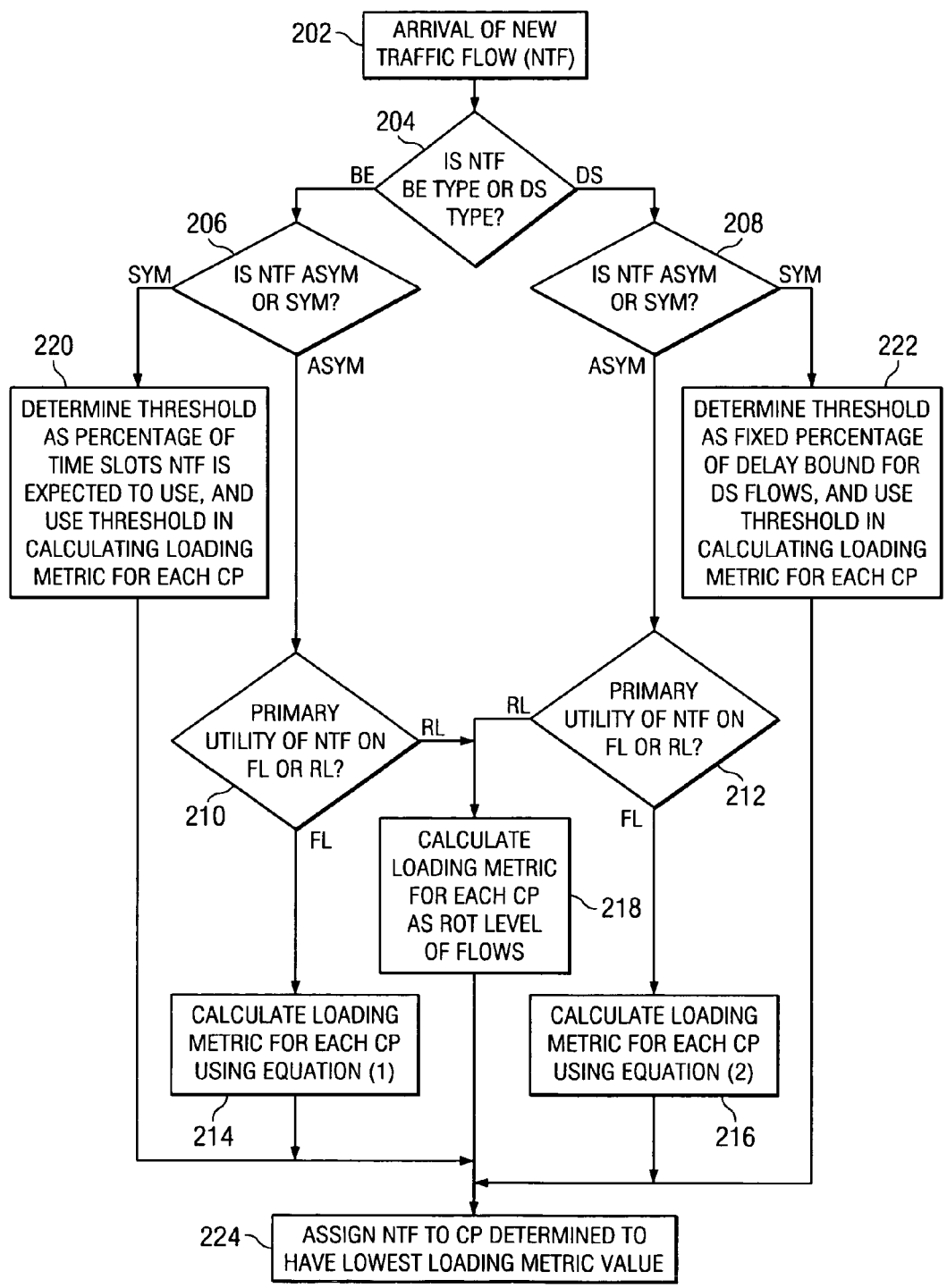

METHOD OF MULTI-CARRIER TRAFFIC ALLOCATION FOR WIRELESS COMMUNICATION SYSTEM

CROSS-REFERENCE TO RELATED APPLICATION

Pursuant to 35 U.S.C. §119(e), this application claims the benefit of U.S. Provisional Patent Application Ser. No. 60/739,986, entitled Multi-Carrier Traffic Allocation for CDMA 1xEV-DO Rev. A, filed Nov. 12, 2005, and named Ozcan Ozturk, Ashvin Chheda, Rza Nuriyev and Alfred Schmidt as inventors, which is hereby incorporated by reference for all purposes.

1. FIELD OF THE INVENTION

The invention disclosed and claimed herein generally pertains to a method and apparatus for allocating or assigning traffic flows in a wireless radio network comprising a Base Transmittal Station (BTS) and one or more Access Terminals (AT). More particularly, the invention pertains to a method of the above type for efficiently distributing the traffic flows among multiple radio carriers or carrier pairs of the system. Even more particularly, the invention pertains to a method of the above type wherein loading metric calculations are carried out to identify the carrier pair that has the least load.

2. BACKGROUND OF THE INVENTION

In a cellular wireless communications system, a radio connection is set up between an Access Terminal (AT) such as a handset and a Base Transmitter Station (BTS), in order to transmit traffic back and forth between them. The traffic can include, without limitation, Voice over IP (VoIP), other voice or audio information, streaming video and digital data in a form such as HTTP or FTP, for use with the Internet. Generally, multiple carriers having a frequency allocation such as 1.25 MHz are used by the same BTS. As used herein, the term "carrier" comprises a carrier pair having a forward link (FL) and a reverse (RL), wherein a forward link carries traffic from the BTS to an AT, and a reverse link conversely carries traffic from an AT to the BTS.

During a radio connection setup it is necessary to select a radio carrier, for use in transmitting a particular traffic flow. Typically, a carrier pair is configured to carry multiple traffic flows. Accordingly, the load on a carrier pair is increased as an increasing number of users start using the carrier pair for both data and voice transmissions. Also, a single user can operate an AT to produce multiple traffic flows, such as one flow for VoIP and another for HTTP data packets.

In view of the substantial and diverse loading that can be placed upon respective carrier pairs of a system, it would be desirable to establish an efficient procedure for assigning newly generated or arriving traffic flows to the carrier pairs. If an arriving flow is assigned to a carrier without considering the current loading levels of available carriers, some carrier pairs might be overloaded while others remain lightly loaded. This can result in underutilization of the over-all system capacity, while at the same time causing congestion and even instability at some of the carrier pairs.

Deficiencies of the above type have characterized previously used techniques for assigning traffic flows to carriers, such as a round robin approach or totally random assignment. In another previous technique, an algorithm was used to assign a flow to a particular carrier based on symmetrical traffic assumptions, that is, on the assumption that the traffic requires the same amount of transmission capacity on both the forward and reverse links. However, this assumption is not valid for certain important classes of traffic flows. For example, HTTP data typically involves an exchange between the user of an AT and an Internet web site, wherein the flow of data is routed through the BTS. Generally, the traffic flow in these situations will be asymmetric, that is, there will be much more traffic through the forward link, from the BTS to the AT, than through the reverse link.

SUMMARY OF THE INVENTION

Embodiments of the invention are directed to a method and apparatus for allocating traffic flows in a wireless communication system that includes a BTS and ATs, as described above. Respective embodiments provide an algorithm that dynamically distributes the traffic load across multiple carriers in a balanced way, during the radio connection setup. More particularly, an arriving user traffic flow is placed on the carrier pair that has the most excess capacity. Some of the traffic flows, such as HTTP or FTP data, are classified as a best effort (BE) flow type. Other flow types, such as VoIP and Push-to-talk, are classified as delay sensitive (DS). The algorithm calculates the loading for each carrier pair, based on flow type, and keeps the loading more uniform across carriers, thus increasing system utilization and capacity, and providing more stability. This allows the system to handle more user traffic and provides better Quality of Service for the users. In one useful embodiment of the invention, wherein a traffic load between a BTS and one or more ATs is carried by multiple carrier pairs, each pair comprising forward and reverse links, a method is provided for assigning a new traffic flow to one of the carrier pairs. The method includes the steps of determining whether the new traffic flow is a BE or a DS traffic flow type, and estimating the comparative utilizations of the new traffic flow on the forward and reverse links of the assigned carrier pair. The new traffic flow is asymmetrical if there will be more utilization of one of the links than the other, and is symmetrical if utilization of the two links will be substantially the same. A procedure is then selected from a set of loading calculation procedures, wherein the selected procedure is determined by both the flow type and the comparative link utilizations of the new traffic flow. The method further comprises the steps of calculating a loading metric value for each of the carrier pairs using the selected procedure, and assigning the new traffic flow to the carrier pair that is found to have the lowest loading metric value.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a flow chart depicting successive steps for an embodiment of the invention.

DETAILED DESCRIPTION OF THE PREFERRED EMBODIMENT

Figure 1:
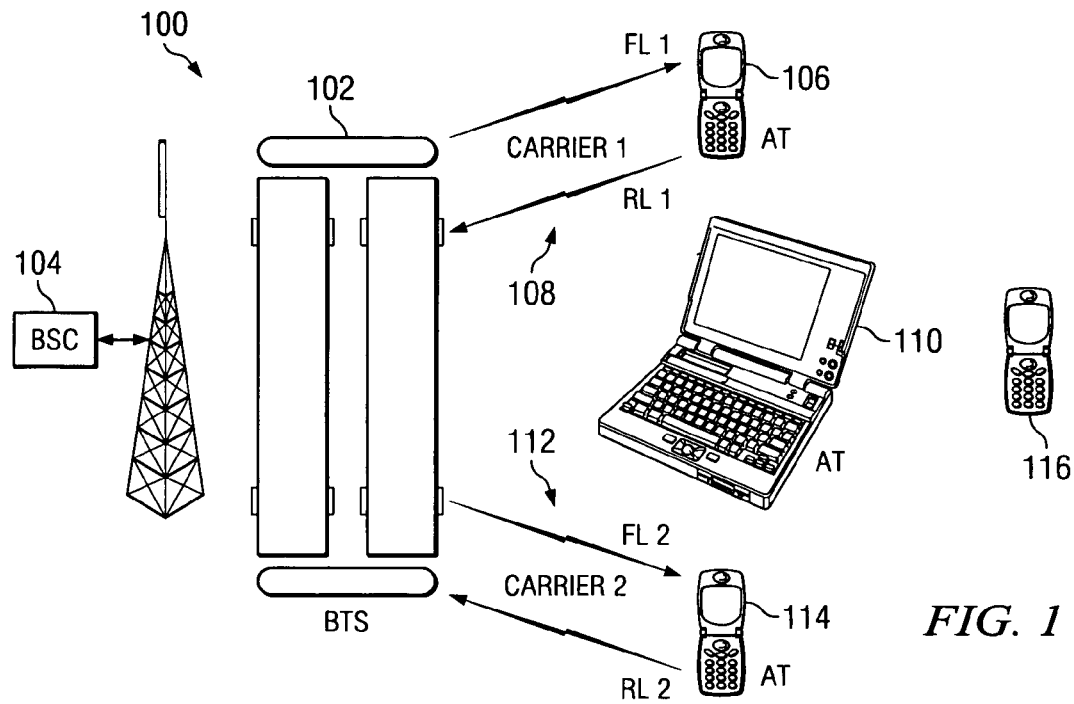
FIG. 1 is a schematic diagram showing a system in which embodiments of the invention may be implemented.

Referring to FIG. 1, there is shown a wireless communication system having a Base Transmitter Station (BTS) 102 controlled by a Base Station Controller (BSC) 104. There is further shown an Access Terminal (AT), such as a handset or wireless phone 106, connected to exchange RF transmissions with BTS 102 over a carrier pair 108. Carrier pair 108, also referenced in FIG. 1 as Carrier 1, comprises a forward link FL 1 for carrying transmissions from BTS 102 to wireless phone 106, and a reverse link RL 1 for carrying transmissions from phone 106 to BTS 102. Similarly, FIG. 1 shows an AT 110, such as a wireless laptop computer, connected to BTS 102 over a carrier pair 112, also referenced as Carrier 2. Carrier pair 112 comprises a forward link FL 2 and a reverse link RL 2.

Carriers 108 and 112 comprise RF transmission paths that usefully employ a well-known transmission technique such as Code-Division Multiple Access (CDMA). Such technique enables each of the carriers to carry multiple traffic flows at the same time. Accordingly, FIG. 1 further shows an additional AT, such as a wireless phone 114, which is also connected by carrier pair 112 to BTS 102. AT 114 thus provides an additional traffic flow through Carrier 2. Moreover, a single AT may produce multiple traffic flows, such as a wireless phone that can also access the Internet. Generally, the traffic flows collectively placed on a carrier pair at any given time make up the total traffic load on the carrier at the given time.

Referring further to FIG. 1, there is shown an AT 116, such as a wireless phone, that must be connected to BTS 102. Accordingly, one of the carrier pairs of communication system 100 must be assigned to AT 116, to carry the new traffic flow that AT 116 will generate. As stated above, the loading on different carrier pairs at a given time is likely to be different, and may be very different from one carrier pair to another. Thus, it would be very desirable to provide a procedure that efficiently assigns each new traffic flow to the carrier pair having the least cumulative traffic load, and thus has the most excess capacity, at the time of assignment.

Embodiments of the invention, directed to a method and apparatus associated with an algorithm, achieve these goals. As an essential feature, the algorithm calculates a loading metric value for each respective carrier pair of the system. This enables a comparison to be made, in order to determine the least loaded carrier for placement of the new traffic flow. This would be the carrier pair found to have the lowest metric value. As a further feature, the loading metric for a carrier pair depends on the use of different variables for its forward and reverse links. This is significant, since the forward link resource is transmission time slots whereas the reverse link resource is transmission power. The forward link resource is time slots because the carriers use time division multiplexing.

In constructing the algorithm, it has been recognized that traffic for certain applications, such as VoIP and streaming video, require a minimum data rate and these types of traffic flows are very sensitive to delay and jitter. On the other hand, HTTP or FTP data flows, which occur for example when an AT is used to serve or access a web site, require only a best effort. As a result, the loading metric calculation for a carrier is also made dependent on the flow types best effort and delay sensitive. For the best effort traffic flows, the main goal is to provide high throughput, whereas for delay sensitive flows the goal is to keep the average packet delay below a certain limit or bound. The loading metric calculation is also dependent on whether a carrier is asymmetric or symmetric, as described hereinafter in further detail. It is to be further emphasized that the ideas and algorithms disclosed herein are generally applicable to any wireless communication system that uses time division multiplexing in scheduling on the forward link of the carrier pair, and code division multiplexing on the reverse link thereof.

In calculating the loading metric on the reverse link of a carrier pair, the loading metric is taken as the average rise-over-thermal (ROT) level. The ROT level is the total signal power received from all the ATs of system 100 at the receiving antenna of BTS 102, divided by the thermal noise. The value of the ROT level can be measured directly at the radio module of the base station. If this measurement is not available, the total signal power for the cell can be approximated by calculating the individual power of each AT signal and taking their sum. The ROT level is usually passed through a discrete lowpass filter to eliminate temporary fluctuations. If this value can be calculated per application type, that is, best effort or delay sensitive, the ROT level for the same application type as the new traffic flow is considered. If only the total ROT level is available, then this value is used to assign all new traffic flows to a carrier.

If a new traffic flow is of a best effort type, the algorithm can calculate the loading metric on the forward link of each carrier pair as a positive decreasing function of the probability that a time slot will be assigned to the new flow during its lifetime. This formulation is based on the assumption that the loading effect of the currently active loads will not change during the lifetime of the new flow. The above probability will depend on the scheduling algorithm used at the BTS. If a Proportional Fair (PF) algorithm is used for best effort traffic, then a loading metric $L_{BE}$ can be defined as:

$$L_{BE} = f(\max(1/N, A) \times B) \quad \text{(Eqn. 1)}$$

In Equation (1), f is a positive decreasing function, N is the number of current active Best Effort flows, A is the probability that a slot is idle, and B is the probability that a slot is used for the transmission of best effort traffic. The rationale for this formula is the fact that the PF algorithm distributes transmission slots equally among active flows over a long time. A and B can be computed online as long-term averages by taking outputs of lowpass filters.

For new traffic flows that are delay sensitive, the packet delay is the most important transmission effect. Thus, the forward link loading metric for each carrier is calculated in terms of the packet delay of DS flows. For certain important systems, this is easy to do for the forward link by measuring the packet delays at the BTS. The loading metric for the DS flows can be as simple as the average packet delay, but it is better to add a multiple of the packet delay variation in order to offset the effect of variations in the packet delay. This number should also be normalized, by dividing with the delay bound. The delay bound is the maximum delay allowed for a traffic type while waiting at the BTS, and a packet is dropped if its delay exceeds this bound. A useful loading metric for the DS traffic flows is:

$$[\text{Mean}(\text{packet delay}) + c \times \text{Std.Dev.}(\text{packet delay})]/[\text{Delay bound}] \quad \text{(Eqn. 2)}$$

In Equation (2) the Mean (packet delay) Std.Dev. (packet delay) can be computed online by passing them through appropriate filters. The delay bound is a fixed quantity for a given traffic flow type. The constant 'c' can be taken as a power of 2 to make computation simpler and faster.

If a new traffic flow will use one link of its assigned carrier pair much more than the other link, the new flow is referred to as an asymmetric traffic flow. For an asymmetric new flow, it is natural to consider the loading metric of each carrier on the link which the new flow will heavily use. For example, web surfing traffic is usually forward link heavy. Thus, when assigning such a flow to a carrier, the carrier that is least loaded on the forward link is selected for the new flow.

A new traffic flow, such as VoIP, that will use both the forward and reverse links of its assigned carrier almost equally is a symmetric traffic flow. Accordingly, an initial step in calculating the loading metric for respective carriers is to determine whether the FL or RL of each carrier is the carrier bottleneck link. That is, for a given carrier pair (one forward and one reverse link), it is necessary to consider the loading levels of both links in order to make a decision for the assignment or placement of the new traffic flow. Since the forward and reverse links of a communication system such as system 100 operate under different principles and protocols, heuristic approaches are used to compare the loading levels of the two links. One such approach is to take the ROT level as the loading metric, if the forward link loading is below a certain threshold, and to take the forward link loading as the carrier (pair) loading if the forward link loading metric is above the threshold. Thus, if the forward links are heavily loaded (above the threshold), the algorithm compares the forward links and selects the least loaded. Otherwise, ROT levels of the reverse links of the carriers are compared, to determine the least loaded carrier pair. The loading metric of a carrier pair is the loading metric of the bottleneck link, whether it is the forward link or the reverse link.

In embodiments of the invention, it is anticipated that the above algorithm should be implemented at each connection setup, that is, each time an AT is connected to a BTS to establish a new traffic flow there between. As described above, different traffic flows may have features or characteristics that are different from one another. Accordingly, the algorithm provides a set of calculation procedures that can be used alternatively to determine a loading metric for the respective carrier pairs in a communication system such as system 100. For a given new traffic flow, a particular procedure will be selected based on the particular characteristics of the new traffic flow. FIG. 2 shows a flow chart summarizing respective calculation procedures of the algorithm, and the characteristics of corresponding new traffic flows.

Step 202 of FIG. 2 indicates that the calculation procedure begins upon the arrival of a new traffic flow (NTF). Initially, it is necessary to determine whether the new traffic flow is a best effort (BE) or a delay sensitive (DS) flow type, as shown by step 204. For a new flow of either type, it is also necessary to determine whether the new traffic flow is asymmetrical or symmetrical, as shown by steps 206 and 208. If the new flow is asymmetrical, steps 210 and 212 show that it becomes necessary to determine whether primary utilization of the assigned carrier pair (CP) will be on the forward link or the reverse link thereof.

Referring further to FIG. 2, step 214 shows that if the traffic flow is best effort and asymmetrical with a heavier utilization expected on the forward link, then the loading of a carrier pair is calculated as given in Equation (1) set forth above.

Step 216 shows that if the traffic flow is delay sensitive and asymmetrical with a heavier utilization expected on the forward link, then the loading of a carrier pair is calculated as given in Equation (2) set forth above.

In accordance with step 218, if the traffic flow is asymmetrical with a heavier utilization expected on the reverse link, then the metric loading for each carrier pair is calculated as a ROT level of flows with the same type as the new flow, if available, and otherwise as the total ROT level.

If the traffic flow is expected to be symmetric, then the loading metric for each carrier pair depends on both the forward link and reverse link variables. If the forward link loading is below a certain threshold value, the loading of the carrier pair is taken as its RL loading metric.

As shown by step 222, the threshold value can be taken as a fixed percentage of the delay bound for delay sensitive flows. That is, if the delay metric given in Equation (2) is below a percentage of the delay bound in forward link carriers, it is assumed that the forward link is not the bottleneck link. Accordingly, only the metric link loading of the reverse link, derived from the ROT level, is used to compare the loading of respective carriers.

As shown by step 220, the threshold value for best effort flow types may be determined as a percentage of time slots that the new traffic flow is expected to use, as calculated in Equation (1). This threshold can be different depending on the required bandwidth of the best effort flow. If a minimum throughput is necessary for the flow, then the threshold level will increase with that required throughput level. If the flow does not need such a minimum bandwidth, that is, it is a pure best effort flow, it may not be necessary to set a threshold.

For a new traffic flow, if the forward link loading in a carrier is above the threshold, the carrier loading will be its forward link loading metric. Otherwise, the reverse link of the carrier is used as the loading metric.

After calculating the loading metric values for respective carrier pairs, the values are compared to determine the carrier pair with the lowest loading metric value. The new traffic flow is then placed on this carrier pair, as shown by step 224. For symmetric flows, if the loading metric of a carrier is its reverse loading metric, then that carrier pair is chosen above carrier pairs wherein the loading metrics are their respective forward link loading metrics.

Figure 3:
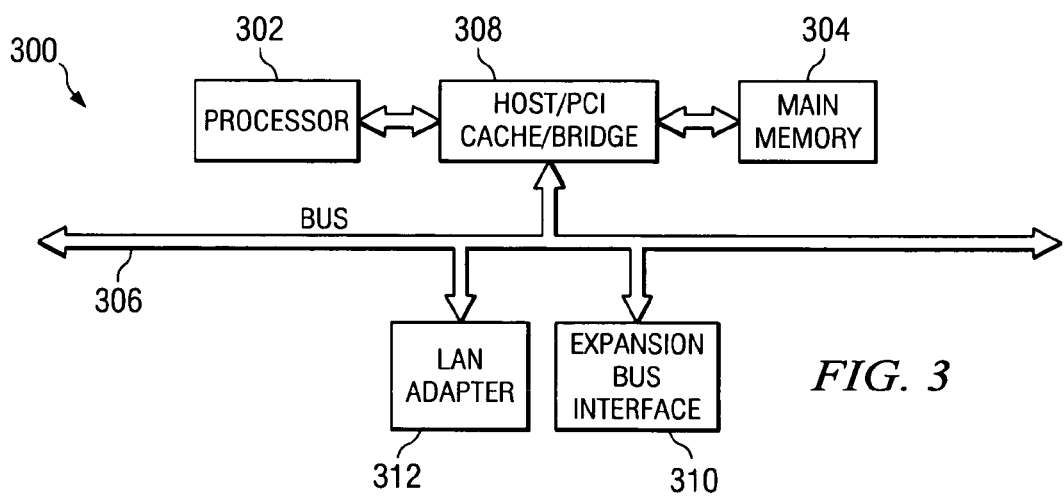
FIG. 3 is a block diagram showing a generalized data processing system that may be used in the system of FIG. 1 to implement embodiments of the invention.

Referring to FIG. 3, there is shown a block diagram of a generalized data processing system 300. System 300 may, for example, reside in BSC 104 or BTS 102 for use in implementing calculation and other operations in accordance with embodiments of the invention. Data processing system 300 exemplifies a computer, in which code or instructions for implementing the processes of the present invention may be located. Data processing system 300 usefully employs a peripheral component interconnect (PCI) local bus architecture, although other bus architectures such as Accelerated Graphics Port (AGP) and Industry Standard Architecture (ISA) may alternatively be used. FIG. 3 shows a processor 302 and main memory 304 connected to a PCI local bus 306 through a Host/PCI bridge 308. PCI bridge 308 also may include an integrated memory controller and cache memory for processor 302.

Referring further to FIG. 3, there is shown a local area network (LAN) adapter 312 and an expansion bus interface 310 respectively connected to PCI local bus 306 by direct component connection.

An operating system runs on processor 302 and is used to coordinate and provide control of various components within data processing system 300 shown in FIG. 3. The operating system may be a commercially available operating system. Instructions for the operating system and for applications or programs are located on storage devices and may be loaded into main memory 304 for execution by processor 302.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device.

Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a wireless communication system, wherein a traffic load between a Base Transmitter Station (BTS) and one or more Access Terminals (AT) is carried by multiple carrier pairs, each pair comprising a forward link (FL) and a reverse link (RL), a method for assigning a new traffic flow to one of said carrier pairs wherein said method comprises the steps of:
    determining whether said new traffic flow is a first traffic flow type or a second traffic flow type;
    estimating the comparative utilizations that said new traffic flow will have on the forward and reverse links of a carrier pair, said new traffic flow being asymmetrical if there will be more utilization of one of said links than the other, and said new traffic flow being symmetrical if utilization of the two links will be substantially the same;
    selecting a procedure from a set of loading calculation procedures, wherein said selected procedure is determined by both the flow type and the comparative link utilizations of said new traffic flow;
    calculating a loading metric value for each of said carrier pairs using said selected procedure, the loading metric value being calculated using a function $f(\max(1/N, A) \times B)$, wherein f is a selected positive decreasing function of a probability that a time slot will be assigned to the new traffic flow, N is a number of current active best effort flows of the new traffic flow, A is a probability that the time slot is idle, and B is a probability that a slot is used for a transmission of best effort traffic; and
    assigning said new traffic flow to the carrier pair found to have the lowest loading metric value.

2. The method of claim 1, wherein:
    said first flow type comprises best effort traffic flow, and said second flow comprises delay sensitive flow.

3. The method of claim 2, wherein:
    said new traffic flow is a best effort type of traffic flow and is asymmetric, wherein most utilization is estimated to be on the forward link of the assigned carrier pair, and said selected procedure includes a selected positive decreasing function of the probability that a time slot will be assigned to said new traffic flow.

4. The method of claim 2, wherein:
    said new traffic flow is a delay sensitive type of traffic flow and is asymmetric, wherein most utilization is estimated to be on the forward link of the assigned carrier pair, and said selected procedure for said loading metric calculation includes calculation of the average packet delay for delay sensitive traffic.

5. The method of claim 4, wherein:
    said loading metric values are calculated using the function [Mean(packet delay)+c×Std.Dev.(packet delay)]/[Delay bound], where the Mean(packet delay) and Std.Dev.(packet delay) values are measured by means of selected filters, the delay bound is a known quantity for a given traffic flow type, and the constant c is taken as a power of 2.

6. The method of claim 2, wherein:
    said new traffic flow is asymmetrical, wherein most utilization is estimated to be on the reverse link of the assigned carrier pair, and said selected procedure for calculating said loading metric values includes calculating an average rise-over thermal (ROT) level for each of said carrier pairs.

7. The method of claim 6, wherein:
    said ROT level is calculated using only traffic flows in a carrier pair that are of the same type as said new traffic flow.

8. The method of claim 2, wherein:
    said new traffic flow is symmetric, and said selected procedure includes calculation of a threshold value for each carrier pair, the loading metric value of a given carrier pair being taken as the loading of the forward link or reverse link of the given carrier pair, according to whether the loading of the forward link of the given carrier pair is respectively greater than or less than the threshold value for said given carrier pair.

9. The method of claim 8, wherein:
    said new traffic flow is a delay sensitive traffic flow, and said threshold level is taken as a specified fixed percentage of the delay bound for delay sensitive traffic flows in said system.

10. The method of claim 8, wherein:
    said new traffic flow is a best effort traffic flow, and said threshold level is dependent upon the percentage of time slots that the new traffic flow is expected to use.

11. The method of claim 8, wherein:
    the loading metric value of said forward link is less than said threshold value, and said selected procedure calculates the loading metric value of a given carrier pair as the ROT level of the reverse link thereof.

12. In a wireless communication system, wherein a traffic load between a Base Transmitter Station (BTS) and one or more Access Terminals (AT) is carried by multiple carrier pairs, each pair comprising a forward link (FL) and a reverse link (RL), a computer program product in a computer readable medium embodying instructions, which when executed by a processor, assigns a new traffic flow to one of said carrier pairs, said the computer program product comprising:
    first instructions for determining whether said new traffic flow is a best effort traffic flow type or a delay sensitive traffic flow type;
    second instructions for estimating the comparative utilizations that said new traffic flow will have on the forward and reverse links of a carrier pair, said new traffic flow being asymmetrical if there will be more utilization of one of said links than the other, and said new traffic flow being symmetrical if utilization of the two links will be substantially the same;
    third instructions for selecting a procedure from a set of loading calculation procedures, wherein said selected procedure is determined by both the flow type and the comparative link utilizations of said new traffic flow, the selected procedure further including a selected positive decreasing function of a probability that a time slot will be assigned to the new traffic flow when the new traffic flow is a best effort type of traffic flow and is asymmetric, the comparative link utilizations being estimated as primarily being on the forward link of the assigned carrier pair;

fourth instructions for calculating a loading metric value for each of said carrier pairs using said selected procedure, the loading metric calculation including a calculation of an average packet delay for delay sensitive and asymmetric traffic of the new traffic flow; and fifth instructions for assigning said new traffic flow to the carrier pair found to have the lowest loading metric value.

13. The computer program product of claim 12, wherein: said new traffic flow is asymmetrical, wherein most utilization is estimated to be on the reverse link of the assigned carrier pair, and said selected procedure for calculating said loading metric values includes calculating an average rise-over thermal (ROT) level for each of said carrier pairs.

14. The computer program product of claim 12, wherein: said new traffic flow is symmetric, and said selected procedure includes calculation of a threshold value for each carrier pair, the loading metric value of a given carrier pair being taken as the loading of the forward link or reverse link of the given carrier pair, according to whether the loading of the forward link of the given carrier pair is respectively greater than or less than the threshold value for said given carrier pair.

15. In a wireless communication system, wherein a traffic load between a Base Transmitter Station (BTS) and one or more Access Terminals (AT) is carried by multiple carrier pairs, each pair comprising a forward link (FL) and a reverse link (RL), an apparatus for assigning a new traffic flow to one of said carrier pairs comprising:

a first processing mechanism that determines whether said new traffic flow is a best effort traffic flow type or a delay sensitive traffic flow type;

a second processing mechanism that estimates the comparative utilizations that said new traffic flow will have on the forward and reverse links of a carrier pair, said new traffic flow being asymmetrical if there will be more utilization of one of said links than the other, and said new traffic flow being symmetrical if utilization of the two links will be substantially the same; and a third processing mechanism that selects a procedure from a set of loading calculation procedures, wherein said selected procedure is determined by both the flow type and the comparative link utilizations of said new traffic flow, the selected procedure further including a selected positive decreasing function of a probability that a time slot will be assigned to the new traffic flow when the new traffic flow is a best effort type of traffic flow and is asymmetric, the comparative link utilizations being estimated as primarily being on the forward link of the assigned carrier pair; the third processing mechanism further calculating a loading metric value for each of said carrier pairs using said selected procedure, the loading metric value calculation including a calculation of the average packet delay for delay sensitive and asymmetric traffic of the new traffic flow; and assigning the new traffic flow to the carrier pair having a lowest loading metric value.

16. The apparatus of claim 15, wherein: said new traffic flow is asymmetrical, wherein most utilization is estimated to be on the reverse link of the assigned carrier pair, and said third processing mechanism selects a procedure for calculating said loading metric values that includes calculating an average rise-over thermal (ROT) level for each of said carrier pairs.

17. The apparatus of claim 15, wherein: said new traffic flow is symmetric, and said third processing mechanism selects a procedure that includes calculation of a threshold value for each carrier pair, the loading metric value of a given carrier pair being taken as the loading of the forward link or reverse link of the given carrier pair, according to whether the loading of the forward link of the given carrier pair is respectively greater than or less than the threshold value for said given carrier pair.

* * * * *